Patented Nov. 23, 1926.

1,608,284

UNITED STATES PATENT OFFICE.

ARTHUR ZITSCHER, OF OFFENBACH-ON-THE-MAIN, GERMANY, ASSIGNOR TO I. G. FARBENINDUSTRIE AKTIENGESELLSCHAFT, OF FRANKFORT, GERMANY.

PREPARATION USEFUL FOR THE PRODUCTION OF DYESTUFFS.

No Drawing. Application filed June 2, 1924, Serial No. 717,211, and in Germany June 11, 1923.

My invention relates to new bodies, which are valuable for the production of dyestuffs.

I have found, that concentrated mixtures of nitrosamin-alkali-metal-salts with alkali metal salts of bodies, containing a methylene group capable of coupling with diazo compounds, form in solid form or in form of a paste bodies of a long lasting, excellent stability. Such mixtures or preparations possess a great technical interest, because they can be used for the production of dyestuffs after diluting with water or thickening substances as well as freshly prepared mixtures of the corresponding components, making it possible to supply the consumer in the most concentrated form with products yielding by simply dissolving in water solutions or printing colors, which can be directly used for the production of dyestuffs on the fiber by means of the one-bath method or for printing.

Thereby the range of shades hitherto obtainable by those compounds is extended most opportunely, the present preparations yielding on the production of dyestuffs prevalently yellow shades or shades ranging to yellow.

Among the substances suitable for use in the present invention, I may mention mixtures prepared from nitrosamin-alkali-metal-salts, which can be obtained for example from nitroanilins, nitrotoluidins, nitroanisidins, chloroanilins, chloronitroanilins, dianisidin and other diazotizable bases, with the alkali metal salts of bodies containing a methylene group capable of coupling with diazo compounds, such as for example pyrazolon derivatives or derivatives of β-ketone-aldehyd, such as arylamids of acetoacetic acid such as for example the anilid, nitroanilid, anisidid or diacylacetyl-arylamins such as diacetoacetylbenzidin or -tolidin and other products of condensation from acylacetic acid esters with di- and monoamino bases, which are described for example in the British Letters Patent Nos. 211,722 and 211,814.

The production of the new preparations may be illustrated by the following examples, the parts being by weight:

Example 1.

32,8 parts of 2.5-dichlorophenylmethyl-pyrazolon are ground with 8,2 parts of caustic soda of 97% strength and 114 parts of a paste of the nitrosamin-sodium salt of ortho-nitroanilin (corresponding to 13,3% of the base and containing 3% of free caustic soda) in a ball-mill to a homogeneous pulp. 155 parts of a paste are obtained.

On printing with this preparation yellow shades are obtained on cotton. Instead of the nitrosamin salt of ortho-nitroanilin for example that of para-nitroanilin can also be used.

The formula for the 2.5-dichlorophenyl-methyl-pyrazolon may be written as follows:

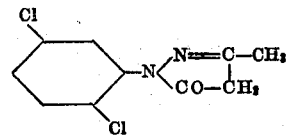

and the formula for the nitrosamin-sodium salt of ortho-nitranilin may be written as follows:

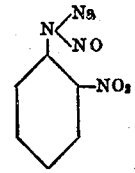

The product obtained in the case of Example 1 is a mixture of such 2.5-dichlorophenyl-methyl-pyrazolon with such nitrosamin-sodium salt of ortho-nitranilin.

Example 2.

20,7 parts of acetoacetyl-para-anisidin are well ground in a ball-mill with 20,6 parts of caustic soda lye of 43° Bé. and then intensely mixed with 114 parts of a paste of the nitrosamin-sodium salt of ortho-nitroanilin (corresponding to 13,3% of the base and containing 3% of free caustic soda). 155 parts of a light brownish paste are obtained.

On printing with this preparation yellow shades are obtained on cotton. Instead of the nitrosamin salt of ortho-nitroanilin for example that of para-chloro-ortho-nitroanilin can also be used.

The product obtained in the case of Example 2 is a mixture of acetoacetyl-para-anisidin with the nitrosamin-sodium salt of ortho-nitranilin. The formula of the latter has been given above in connection with Example 1; the formula of acetoacetyl-para-anisidin may be written as follows:

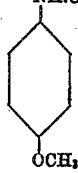

*Example 3.*

38 parts of diacetoacetyl-ortho-tolidin are finely ground with 16,5 parts of caustic soda of 97% strength and then well mixed with 95,3 parts of a paste of 33,5% of the nitrosamin-sodium salt of 3-nitro-4-toluidin, containing also 5% of free caustic soda. Then the mass is dried in vacuo at a moderated temperature and ground to a fine powder.

On printing with this product reddish yellow shades are obtained on cotton.

The product obtained in the case of Example 3 is a mixture of diacetoacetyl-ortho-tolidin with the nitrosamin-sodium salt of 3-nitro-4-toluidin. The formula of diacetoacetyl-ortho-tolidin may be written as follows:

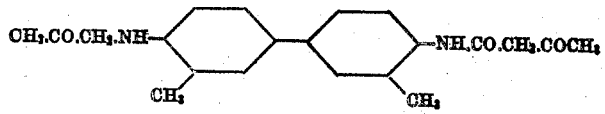

and the formula of the nitrosamin-sodium salt of 3-nitro-4-toluidin may be written as follows:

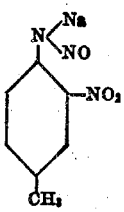

*Example 4.*

38 parts of diacetoacetyl-ortho-tolidin are finely ground with 16,5 parts of caustic soda of 97% strength and then worked in a ball-mill with 237 parts of a paste of 15% of the nitrosamin-sodium salt of 2.5-dichloroanilin to a homogeneous pulp.

On printing with this product yellow shades are obtained on cotton.

The product obtained in the case of Example 4 is a mixture of diacetoacetyl-ortho-tolidin with the nitrosamin-sodium salt of 2.5-dichloroanilin. The formula of the former has been given above in connection with Example 3; the formula of the nitrosamin-sodium salt of 2.5-dichloroanilin may be written as follows:

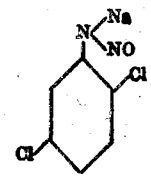

*Example 5.*

38 parts of diacetoacetyl-4.4'-diaminoazobenzene are ground in the same manner, as described in Example 4, with the indicated quantities of caustic soda and of the nitrosamin-sodium salt of 2.5-dichloroanilin.

On printing with this product reddish yellow shades are obtained on cotton.

The product obtained in the case of Example 5 is a mixture of diacetoacetyl-4.4'-diaminoazobenzene with the nitrosamin-sodium salt of 2.5-dichloroanilin. The formula of the latter has been given above in connection with Example 4; the formula of diacetoacetyl-4.4'-diaminoazobenzene may be written as follows:

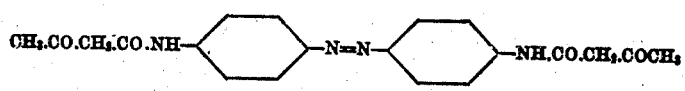

*Example 6.*

28,1 parts of acetoacetyl-4-aminoazobenzene are ground with 20,6 parts of caustic soda lye of 43° Bé. and 42 parts of a paste of the nitrosamin-sodium salt of 5-nitro-2-toluidin (corresponding to 40% of the base and containing 3% of free caustic soda) in a ball-mill to a homogeneous paste.

On printing with this product reddish yellow shades are obtained on cotton. Instead of the nitrosamin salt of 5-nitro-2-toluidin for example that of para-nitro-ortho-anisidin can also be used.

The product obtained in the case of Example 6 is a mixture of acetoacetyl-4-aminoazobenzene with the nitrosamin-sodium salt of 5-nitro-2-toluidin. The formula of acetoacetyl-4-aminoazobenzene may be written as follows:

and the formula of the nitrosamin-sodium salt of 5-nitro-2-toluidin may be written as follows:

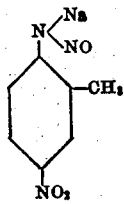

Now what I claim and desire to secure by Letters Patent is the following:

As new articles products useful for the production of dyestuffs consisting in mixtures of nitrosamin-alkali metal salts with alkali metal salts of bodies containing a methylene group capable of coupling with diazo compounds.

In testimony that I claim the foregoing as my invention, I have signed my name, this 14th day of May, 1924.

ARTHUR ZITSCHER.